United States Patent Office 2,958,653
Patented Nov. 1, 1960

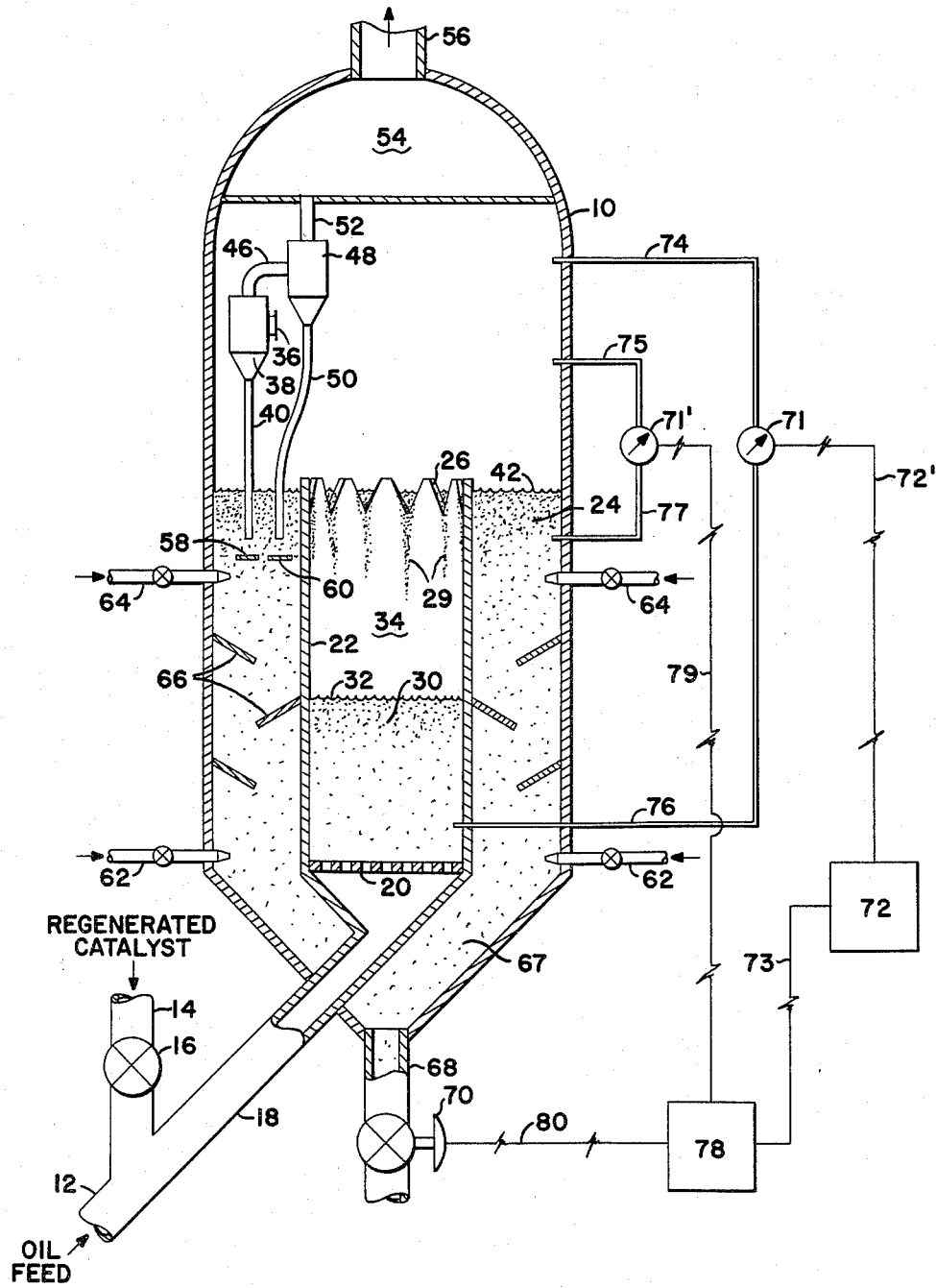

2,958,653

CONVERSION OF HYDROCARBONS IN A FLUIDIZED REACTION ZONE

Theodore John Kruse, Jr., Baton Rouge, La., assignor to Esso Research and Engineering Company, a corporation of Delaware Filed Aug. 14, 1956, Ser. No. 603,930

8 Claims. (Cl. 208—164)

This invention relates to the contacting of finely divided solids with gasiform materials and more particularly relates to the catalytic conversion of hydrocarbons using finely divided catalyst particles.

More specifically, the invention relates to fluid catalytic conversion processes in which fluidized catalyst is contacted with hydrocarbons in a reactor and subsequently the hydrocarbons are removed from the catalyst by a gas stripping operation.

An important operating variable in catalytic cracking is the reactor space velocity, which is the ratio of oil feed rate to weight of catalyst in the reactor. Since oil feed rate is relatively fixed, space velocity is changed by changing the amount of catalyst in the dense bed. It is often advantageous economically to increase cracking severity by increasing reactor holdup, rather than by changing other variables, such as catalyst circulation rate or reactor temperature. This is because each variable has a unique effect on product distribution. For maximum reactor efficiency, provision must be made for flexibility and control over reactor holdup.

The economics of catalytic cracking are also related to the quantity of unstripped hydrocarbon products leaving the catalyst stripper with the spent catalyst and subsequently wasted by burning in the regeneration zone. The quantity of unstripped hydrocarbon is affected by operating conditions in the stripper, and also by the state of the catalyst-vapor mixture entering the stripper bed. Best results are obtained when catalyst is transferred from the top of the reactor dense bed to the top of the stripper. The molecular weight of the hydrocarbon is lowest on leaving the top of the reactor bed, and the lower the molecular weight, the greater the reduction of strippable hydrocarbon losses to the regenerator. The highest possible concentration of steam in the vapors entrained with the entering catalyst helps stripping, and this is also best accomplished by mixing of the reactor and stripper effluents in the disperse phase above the stripper. To minimize the strippable hydrocarbon losses, provision should be made in the reactor and stripper design for continuous disperse phase transfer of catalyst from the top of the reactor bed to the top of the stripper.

An early development in the design of commercial catalytic cracking units was to consolidate the reactor and catalyst stripper into one vessel in order to reduce investment cost and simplify catalyst flow. However, there is still need for an improved reactor stripper design since the designs do not have provision for both (1) flexibility and control over the amount of catalyst in the reactor dense bed, and (2) continuous disperse phase transfer of spent catalyst from the top of the reactor bed to the stripper. In some commercial catalytic cracking units it is not possible to change reactor holdup. In other designs the spent catalyst is transferred to the stripper from the bottom or an intermediate part of the reactor bed and this is less efficient. In other types of designs, the volume of catalyst in the bed cannot be increased without adversely affecting the state of the catalyst-hydrocarbon mixture entering the stripper; for example, it may increase pressure in the stripper, which increases the weight per unit volume of entrained vapor, or it may necessitate a change from disperse phase to dense phase transfer of spent catalyst from reactor to stripper, thereby increasing the quantity of hydrocarbon entrained with the catalyst.

According to the present invention, finely divided solids entrained with gasiform material leaving a fluidized bed of solids in a contacting zone are separated from the gasiform material first, by detrainment in a lower velocity zone and second, by passing the remainder through a dust separating means such as a cyclone separator or the like and the separated solids are discharged into a solids stripping zone or section. Excess separated solids are recirculated to the fluidized bed in the contacting zone from the stripping zone and the level of the fluidized bed in the contacting zone is controlled by withdrawal of solid particles from the stripping zone. This is important in catalytic cracking as the cyclone separator acts as an initial stripping stage and the reintroduction of catalyst to the reactor from the stripping section is used to maintain a desired catalyst level in the reactor.

In the preferred form of the invention, high solids entrainment from the dense catalyst bed is desirable so that the solids entrained in the upflowing gas equal the rate of solids introduction into the reactor plus the solids recycle from the stripping zone to the reactor. Solids recycle from the stripping zone to the reactor provides the means for controlling holdup of catalyst in the reactor. With the present invention stripper efficiency is improved over stripping zones which receive catalyst directly from the dense fluidized reactor bed and wide flexibility of control of holdup of catalyst in the reactor is provided.

In the drawing, the figure represents a vertical cross sectional view of the preferred form of the present invention.

Referring now to the drawing, the reference character 10 designates a vertical cylindrical vessel which is adapted for use in contacting finely divided solids and gasiform material broadly but the apparatus will be specifically described in connection with the catalytic cracking of hydrocarbons. In catalytic cracking the oil to be cracked, which may be naphtha, kerosene, light or heavy virgin gas oil, catalytic cycle gas oil, thermally cracked gas oil, deasphalted oil, solvent treated oil, or reduced crude, is preferably preheated by heat exchange with refinery streams and the preheated oil at a temperature of about 500° F. to 800° F. is mixed with a sufficient amount of hot regenerated catalyst particles to vaporize the oil and also to raise it to cracking temperature. The preheated oil is introduced through line 12 and is admixed with catalyst from regenerated catalyst standpipe 14 having a control valve 16. Or the standpipe 14 may be a U-bend or other means of transferring catalyst. Only a portion of the standpipe 14 is shown in the drawing.

The temperature of the cracking zone may be between about 800° and 1000° F. The temperature in the regeneration zone (not shown) may be between about 1000° and 1200° F. The regenerated catalyst in standpipe 14 will be at essentially the same temperature of the regenerated catalyst bed. The catalyst to oil ratio required to transfer heat and control cracking severity is normally between about 1 to 1 to 20 to 1 parts by weight. The catalyst for cracking may be any conventional catalyst such as silica-alumina containing about 13 to 40% alumina by weight, acid treated bentonitic clays, silica-magnesia, etc. The catalyst may be in the form of a ground catalyst or microspherical catalyst made by spray drying or other processes producing small spherical or spheroidal catalyst particles. The catalyst particles are preferably of an average size of about 40 to 80 microns with some particles of size above and below this range.

The vaporous mixture of catalyst and oil is passed upwardly as a suspension in line 18 through distribution grid 20 arranged into the bottom of a central short hollow cylindrical member 22 which forms a reaction zone and which is concentric with vessel 10 but of a smaller diameter to form annular space 24 between the exterior of member 22 and the interior wall of vessel 10. This annular space forms a stripping zone or section and will be hereinafter described in greater detail. The bottom of cylindrical member 22 is preferably sealed to the edge of grid 20 to prevent any vapor leakage in this region. The height of cylindrical member 22 is dependent on the maximum reactor bed volume requirements for the specific feed stocks to be cracked; and also on the density of the catalyst at the design vapor velocity. The height of cylinder 22 may be between about 0.4 and 0.8 the height of the vertical straight side of vessel 10. The diameter of cylinder 22 may be between about 0.5 and 0.9 the diameter of vessel 10.

In the preferred form the upper end of cylindrical member 22 has multiple V-shaped notches 26 therein to form a variable weir for catalyst overflow from the stripping section 24 to the fluid bed 20. The variable weir provides better control over the amount of catalyst recycled to the bed 20, and is designed so that a change in catalyst level of about one foot will vary the catalyst recycle to the bed from zero to the desired maximum. Recycle or return of the catalyst to the bed 30 is shown by reference character 29. Instead of the notches, the cylindrical member 22 may be extended up a few feet and be in the form of a cylinder with no notches in the upper end, but instead holes can be provided in the wall of member 22 a few feet down from the upper end of the member 22. The holes will be arranged so that the centers are in the same horizontal plane and preferably will be sized for a maximum variation in catalyst level in the stripper of about one foot, to provide better control of catalyst recycled to the bed. Instead of the circular holes, circumferential slots may be provided. Or the top of the cylindrical member 22 may form a circular weir with no notches or holes of any kind so that the upper end is a circle.

The superficial velocity of the hydrocarbon vapors and any added steam passing upwardly through the catalyst bed 30 is between about 2 and 10 ft./sec. and is selected to maintain the bed 30 as a relatively dense turbulent fluidized bed having a level indicated at 32 with a dilute phase or disperse phase 34 thereabove. The cracked vaporous products passing up through dilute phase 34 contain entrained catalyst and as the vaporous products leave the top of the cylindrical members 22 there is a reduction in velocity and some catalyst particles detrain or drop out of the suspension or dilute phase into the top of stripping section 24. The cracked vapors containing entrained solids are passed through opening 36 into one or more cyclone separators 38 where most of the entrained catalyst particles are separated and the separated catalyst particles are passed down dipleg 40 into the stripping section 24 below the level 42 of fluidized catalyst therein.

The cracked vapors containing some entrained catalyst particles leave cyclone separator 38 through line 46 and pass into secondary cyclone separator 48 were additional catalyst particles are separated and returned through dipleg 50 to the stripping section 24 below the level 42 of catalyst therein. The separated vapors then leave separator 48 through line 52 to plenum chamber 54 and thence through outlet 56 to fractionating equipment or the like (not shown) for separation of desired products. Arranged below each dipleg in the stripping section are diagrammatically shown baffles or other type of dipleg seals 58 and 60 to prevent upward flow of gas from the stripping section 24 through diplegs 40 and 50. It is important that the seals be of a type which permits deaeration of catalyst in the diplegs 40 and 50, or if the seals be of a type which require aeration, that the seals be aerated with steam or stripping gas. Either means reduces the volume of hydrocarbon entering the stripper.

Steam or other suitable gas is introduced into the stripping section 24 through a plurality of nozzles arranged around the circumference of the stripping section. Preferably one set of nozzles is shown at 62 for introducing steam into the bottom of the stripping section 24 and another set of nozzles is shown at 64 for introducing steam near the top of the stripping section 24, preferably below the outlet of diplegs 40 and 50. Sufficient steam is introduced to strip out hydrocarbons from the spent catalyst so that the mixture of steam and stripped-out hydrocarbon leaves the top of stripping section 24. It is noted that catalyst detraining into stripper 24 passes through a steam-rich atmosphere above the stripper and some stripping takes place in the disperse phase above 42. The effluent from the stripper is mixed with upflowing vapor and catalyst entering cyclone separator 38, and this mixing effectively reduces the concentration of hydrocarbon in the vapors. Since a part of these vapors are entrained down cyclone diplegs 40 and 50 with catalyst separated in cyclone separators 38 and 48, the reduced concentration of hydrocarbon therein helps stripping.

The stripping section 24 is preferably provided with slanting vertically spaced baffles 66 or these baffles may be of a different kind or may be omitted. Or the stripping section 24 may be separated into long vertical cells with the top of the cells ending near the top of cylinder 22. The spent catalyst particles after stripping pass down through annular cone 67 at the bottom of vessel 10 and through outlet line 68 to the regenerator. The rate of withdrawal of stripped catalyst through line 68 and the rate of circulation of catalyst to the regenerator is controlled by slide valve 70. From line 68 the stripped spent catalyst is picked up by an air stream and carried to a regeneration zone (not shown) where the carbonaceous deposit is burned off the catalyst with air.

The maximum catalyst level 32 in the reaction zone is below the catalyst level 42 in the stripper section 24. The catalyst level 42 in the stripping section 24 is maintained above the reactor level so that the catalyst particles overflow from the stripping section 24 through the bottom portions of the V-shape notches 26 and stripped catalyst is recycled to the reaction zone in cylinder 22.

The weight of catalyst in reactor 22 is measured directly by means of a pressure differential indicator 71 having a top connection 74 in the vapor space above cylinder 22, and a bottom connection 76, located at the bottom of the dense fluidized bed 30. The level of catalyst 42 in the stripper 24 is also measured by means of a pressure differential indicator 71' having a top connection 75 in the vapor space above cylinder 22, and a bottom connection 77 located below the V-shaped notches 26 but above the level of dipleg seals 58 and 60. The reactor pressure differential indicator 71 is operatively connected by a line shown diagrammatically at 72' with controller 72. The controller 72 may be any type of indicator controller such as Foxboro, etc. Controller 72 has a control index which is manually set at the selected catalyst holdup in reaction zone 22. Controller 72 is operatively connected by a line diagrammatically shown at 73 with another controller 78 which is connected to differential pressure indicator 71' by a line diagrammatically shown at 79 and with slide valve 70 by a line diagrammatically shown at 80. The position of the differential pressure indicator 72 relative to the control index produces an output signal which may be pneumatic, electrical or the like and which is transmitted via line 73 to controller 78. The output signal from controller 78 automatically positions slide valve 70 by actuating a driver such as a motor, a hydraulic piston, or the like (not shown).

Preferably, the output signal from controller 72 automatically resets the control index on the stripper level controller 78. The control index on stripper level controller 78 is equipped with a stop to prevent stripper level 42 from dropping below the dipleg seals 58 and 60, during abnormal operations. The amount of catalyst from stripper 24 passing through slide valve 70 regulates the head of stripped catalyst 42 above the bottom of the V-shaped notches 26 and thereby fixes the rate of catalyst overflow from the stripper 24 required to maintain the selected weight of catalyst in reactor bed 30.

An alternate form of the invention employs an instrumentation system wherein the output signal passing through line 73 from reactor holdup meter or controller 72, automatically actuates movement of slide valve 70 and this signal is transmitted directly to the slide valve control element instead of resetting a stripper level indicator and in this case controller 78 is omitted and line 80 in effect forms an extension of line 73. To prevent the stripper level from falling below the bottom of diplegs 40 and 50 during an abnormal operating condition, a stripper level differential pressure indicator controller like controller 78 may be utilized to close stripper outlet valve 70 when the minimum stripper level is reached and in this case the stripper level controller actuates a switch which automatically disconnects line 73 from slide valve 70.

The differential pressure controller 72 operates to maintain the selected holdup in the reactor catalyst bed 30 as follows: If the velocity of the upflowing gases or vapors in line 18 is increased, more catalyst particles will be carried overhead from the bed 30 and the pressure differential from 74 to 76 will decrease. Since the pressure differential controller 72 is set to maintain the original pressure differential, the output signal via line 73 will change to directionally increase the catalyst stripper level control index on controller 78. The output signal from controller 78 will therefore cause slide valve 70 to move toward closed position a sufficient amount to build up the level 42 of catalyst in the stripping section 24 so that more stripped catalyst overflows through the V-shaped notches 26 and is returned or recycled to the fluid reactor bed 30 to make up for the higher entrainment rate. When the catalyst bed 30 reaches the selected holdup as indicated on controller 72 and steady flow conditions prevail at the higher gas velocity, stripper level will be somewhat higher to balance the higher entrainment rate from reactor 30 and the withdrawal rate to the regenerator will be the same as before.

However, the preferred operation of this form of the invention is to have a high solids entrainment such that the amount of solids or catalyst particles entrained with the cracked vaporous product leaving the upper end of cylinder or reactor 22 substantially equals the amount of solids or catalyst particles introduced through line 18 plus the amount of solids or catalyst recycled from the stripping section 24 by means of notches 26. The entrainment from bed 30 is maintained high and more catalyst is entrained than is introduced via line 18 so that substantially continuously, catalyst is recycled from the top of stripper 24 to bed 30 and the pressure differential indicators 72 and 78 are set to effect this result.

In the form of the invention shown in the drawing, the maximum level of fluid catalyst bed 30 in the reactor is below the catalyst level in the stripper 24, and the minimum level 32 is reached only at the point at which the entrainment rate out of cylinder 22 approximately equals the circulation rate. Improved stripping is obtained because the catalyst is transferred in disperse phase from the top of the catalyst bed 30 in the reactor into the top of stripper 24 and only strippable hydrocarbon of the lowest average molecular weight, and therefore easiest to strip, enters the stripper; and stripping of the catalyst falling into the stripper is accomplished in the disperse phase above the stripper; and the catalyst entering the stripper from the cyclone separators has a minimum amount of hydrocarbon vapors entrained with it. The catalyst is also stripped additionally in the upper portion of stripping section 24.

In a specific example of the form of the invention shown in the drawing, the vessel 10 is designed for the following process conditions:

| | |
|---|---|
| Gas oil feed, b./d. | 50,000 |
| Average catalyst particle size, microns | 40 to 80 |
| Catalyst holdup in reaction zone 30, tons (range) | 20 to 36 |
| Catalyst circulation rate, tons/minute (range) | 35 to 45 |
| Reactor temperature, °F. | 920 |
| Reactor top pressure 74, p.s.i.g. | 20 |
| Reaction zone 30 superficial gas velocity, ft./sec. | 4 |

The dimensions of vessel 10 are as follows:

| | |
|---|---|
| Diameter of vessel 10, ft. | 19 |
| Height of outer cylindrical section 10, ft. | 35 |
| Diameter of inner cylindrical section 22, ft. | 13.5 |
| Height of inner cylindrical section 22, ft. | 21.5 |
| Number of V-shaped notches 26 | 24 |
| Notch height, inches | 12 |
| Notch width, inches | 18 |
| Number of cyclone stages 38 and 40 | 2 |
| Number of cyclones per stage | 8 |
| Distances from top of inner cylinder 22, ft.: | |
| to bottom of cyclone inlet duct 36 | 10 |
| to bottom tap 77 of stripper indicator controller | 2 |
| to bottom of cyclone diplegs 58 and 60 | 4 |
| to upper stripping steam nozzles 64 | 5 |
| to lower stripping steam nozzles 62 | 20 |

The following is a specific example of one operation of vessel 10 while processing 50,000 b./d. of gas oil at a catalyst circulation rate of 45 tons per minute and a catalyst holdup in reaction zone 30 of 20 tons. Twenty tons of catalyst above grid 20 in the 13.5 foot diameter cylinder 22 produces a pressure differential of 1.88 p.s.i. across pressure taps 74 and 76, and this pressure differential is set on the control index of pressure differential indicator controller 72. With an upflowing 4 ft. per second superficial gas velocity in cylinder 22, the density in the fluidized bed 30 is about 24 lbs./cu. ft. and the bed level is about 11.5 ft. above grid 20 or about 10 ft. below the top of cylinder 22. Entrainment from bed 32 is a function of both velocity and the distance from the top of the bed 32 to the top 28 of the cylinder 22. Entrainment at a minimum dense bed holdup of 20 tons is slightly in excess of catalyst circulation rate or about 48 to 50 tons/minute. As the distance from the top of bed 32 to the top of cylinder 22 decreases, the catalyst entrainment rate increases.

However, in this example, since the catalyst circulation rate of 45 tons/minute is less than the catalyst entrainment rate, the bed level 32 will tend to drop below 11.5 ft. above grid 30. The lower level 32 causes the pressure indicator reading on pressure differential indicator controller 72 to drop below the control index. The change thus produced in output signal 73 will directionally raise the control index on pressure differential indicator controller 78 to call for a higher level 42 in stripper 24. The difference in index and indicator readings on pressure differential indicator controller 78 will produce a change in output signal 80, which actuates the valve positioner on slide valve 70 in standpipe 68, with the result that slide valve 70 moves toward the closed position to decrease the amount of catalyst leaving stripping zone 24. As a result, the level of catalyst 42 builds up in the stripping zone 24 and more catalyst overflows through the bottom of notches 26 and is recycled to fluid bed 30 by way of downflowing streams 29.

This recycle of catalyst to bed 30 continues to maintain the desired bed level 32. This is so because more catalyst is continuously entrained out of fluid bed 30 than is added to the fluid bed from line 18 and so to maintain the desired level 32 catalyst is recycled from the stripper 24. The entrained catalyst is separated from the entraining gas and the detrained or separated catalyst is delivered to the stripping section 24 partly through diplegs 40 and 50 and partly through settling out of the entraining gas by the reduction in upflow velocity of the entraining gases and vapors as they leave the top of inner cylinder or reactor 22.

Better stripping of the spent catalyst is obtained in this form of the invention, as the catalyst entrained in vapors and gases leaves he fluid bed 30 in the dilute phase and passes through one or more cyclone separators or the like which also assists in stripping out hydrocarbons from the catalyst. Also the catalyst from diplegs 40 and 50 is introduced about 3 feet below level 42 in the stripping zone 24 and steam is introduced through lines 64 about 1 foot below the outlet ends of diplegs 40 and 50 and the catalyst in the upper part of the stripper 24 stripped by steam introduced through lines 64. Some of this stripped catalyst is returned or recycled to the reactor bed 30 from the top of the stripping section 24. The amount of steam introduced through lines 64 is about one-third to one-half of the total, and the remainder is introduced through lines 62. The stripped catalyst passing through conical passageway 67 has a strippable carbon content by weight which will vary with molecular weight of hydrocarbon entering the stripper, and the molecular weight in turn is set by the cracking conversion in reactor 22. Dilute phase stripping gives strippable carbon contents of 0.01 to 0.020 wt. percent on catalyst, which is two to four times better than dense phase stripping in the same stripper. Dilute phase stripping can be employed on some commercial units by catalyst overflow from the reactor and falling into the dilute phase in the stripper, but this is possible only when a minimum level of catalyst is held in the reactor dense bed. At higher catalyst holdups, dense phase stripping would necessarily be employed. For a given stripper length and volume, and a given steam rate, this invention will give better results than dilute phase stripping, and this high degree of efficiency can be maintained over the normal operating range of reactor holdups required by commercial operation.

While specific examples including a particular size reaction vessel have been given, it is to be expressly understood that these are by way of example and that modifications and changes may be made without departing from the spirit of the invention.

What is claimed is:

1. A method of contacting gasiform material and finely divided solids in a fluidized bed of solids in a cylindrical contacting zone surrounded by and concentric with an annular stripping zone, which comprises passing gasiform material and finely divided solids into the bottom portion of said contacting zone for upward passage therethrough, selecting a velocity of the gasiform material to produce a dense fluidized bed of solids in said contacting zone and sufficient to entrain more solids than are added to said contacting zone with said gasiform material and to continuously transfer solids solely from the top of said fluidized bed in said contacting zone to the upper portion of said stripping zone, maintaining the level of the dense fluidized bed of solids in said contacting zone below the upper end thereof, withdrawing solids from the bottom of said stripping zone at a rate selected to maintain a dense fluidized bed of solids in said stripping zone sufficient to fill said stripping zone, separating entrained solids from gasiform material leaving said contacting zone in the dilute phase above the level of the dense fluidized bed of solids therein and passing the separated solids to the upper portion of said fluidized bed of solids in said stripping zone below the upper surface thereof, and returning solids from the upper level of fluidized solids in said stripping zone to the upper portion of said fluidized bed in said contacting zone in an amount substantially equal to the difference between the amount of solids entrained with the upflowing gasiform material leaving said contacting zone and the amount of solids passed into the bottom portion of the contacting zone with said gasiform material.

2. A method of contacting gasiform material and finely divided solids in a fluidized bed of solids in a cylindrical contacting zone surrounded by and concentric with an annular stripping zone, which comprises passing gasiform material and finely divided solids into the bottom portion of said contacting zone for upward passage therethrough, selecting a velocity of the gasiform material to produce a dense fluidized bed of solids in said contacting zone and sufficient to entrain more solids than are added to said contacting zone with said gasiform material and to continuously transfer solids solely from the top of said fluidized bed in said contacting zone to the upper portion of said stripping zone, maintaining the level of the dense fluidized bed of solids in said contacting zone below the upper end thereof, maintaining a dense fluidized bed of solids in said stripping zone, separating entrained solids from gasiform material leaving said contacting zone in the dilute phase above the level of the dense fluidized bed of solids therein and passing the separated solids to the fluidized bed of solids in stripping zone below the upper surface thereof, maintaining the level of solids in said fluidized bed in said stripping zone higher than the level of solids in said dense fluidized bed in said contacting zone and overflowing solids from the upper level of the bed of fluidized solids in said stripping zone and passing them to the upper portion of said fluidized bed in said contacting zone in an amount substantially equal to the difference between the amount of solids entrained with the upflowing gasiform material leaving said contacting zone and the amount of solids passed into the bottom portion of the contacting zone with said gasiform material.

3. A method of contacting gasiform material and finely divided solids in a fluidized bed of solids in a cylindrical contacting zone surrounded by and concentric with an annular stripping zone, which comprises passing gasiform material and finely divided solids into the bottom portion of said contacting zone for upward passage therethrough, selecting a velocity of the gasiform material to produce a dense fluidized bed of solids in said contacting zone and sufficient to entrain more solids than are added to said contacting zone with said gasiform material and to continuously transfer solids solely from the top of said fluidized bed in said contacting zone to the upper portion of said stripping zone, maintaining the level of the dense fluidized bed of solids in said contacting zone below the upper end thereof, maintaining a dense fluidized bed of solids in said stripping zone, separating entrained solids from gasiform material leaving said contacting zone in the dilute phase above the level of the dense fluidized bed of solids therein and passing the thus separated solids to the upper portion of said fluidized bed of solids in said stripping zone below the upper surface thereof, maintaining the stripping zone full of solids and the level of solids in said fluidized bed in said stripping zone higher than the level of solids in said dense fluidized bed in said contacting zone and overflowing solids from the upper level of the fluidized bed of solids in said stripping zone to the dilute phase in said contacting zone for downward passage to the upper portion of said fluidized bed in said contacting zone in an amount substantially equal to the difference between the amount of solids entrained with the upflowing gasiform material leaving said contacting zone and the amount of solids passed into the bottom portion of the contacting zone with said gasiform material.

4. A method of contacting finely divided solids and gasiform material in a contacting zone surrounded by an annular and concentric stripping zone in a large containing zone extending above said contacting zone and said stripping zone, withdrawing gasiform material overhead from said large containing zone, withdrawing solids from the bottom of said large containing zone, introducing finely divided solids and gasiform material into the bottom of said contacting zone for upward passage therethrough, passing gasiform material upwardly through said contacting zone at a velocity selected to produce a dense turbulent fluidized bed therein and at a sufficiently high velocity to entrain overhead more solids than are added to the bottom of said contacting zone in said first step and to continuously transfer solids solely from the top of said fluidized bed of solids in said contacting zone to the top of said stripping zone, maintaining a fluidized bed of solids in said stripping zone, maintaining the level of the bed of fluidized solids in said contacting zone below the upper end of said contacting zone, separating entrained solids from upflowing gasiform material in the upper portion of said large containing zone above said contacting and stripping zones and passing the thus separated solids to the upper portion of said stripping zone below the level of fluidized solids therein, controlling the rate of withdrawal of solids from the bottom of said large containing zone to fill said stripping zone, directly returning stripped solids from the upper portion only of said fluidized bed of solids in said stripping zone to the upper portion of said fluidized bed of solids in said contacting zone by overflowing the upper end of said contacting zone in order to maintain the selected level of fluidized solids in said contacting zone and to compensate for the withdrawal overhead of more solid particles than are added to said contacting zone in said first step.

5. A method according to claim 1 wherein hydrocarbon oil is cracked in the presence of finely divided cracking catalyst.

6. A method according to claim 4 wherein hydrocarbon oil is cracked in the presence of finely divided cracking catalyst.

7. A method according to claim 4 wherein the pressure drop across said fluidized bed in said contacting zone is maintained substantially constant by controlling the amount of stripped solids leaving said stripping zone and thereby controlling the amount of solids being returned from said stripping zone to said contacting zone.

8. A method according to claim 4 wherein the top level of the bed of fluidized solids in said stripping zone is above the top level of the fluidized solids bed in said contacting zone.

References Cited in the file of this patent
UNITED STATES PATENTS

| | | |
|---|---|---|
| 2,509,745 | Riggs | May 30, 1950 |
| 2,606,863 | Rehbein | Aug. 12, 1952 |
| 2,615,796 | Peet | Oct. 28, 1952 |
| 2,728,642 | Cunningham | Dec. 27, 1955 |
| 2,743,998 | Swart et al. | May 1, 1956 |
| 2,862,786 | Trainer | Dec. 2, 1958 |